United States Patent

[11] 3,620,698

[72] Inventors: Warren G. Schlinger, Pasadena; William L. Slater, La Habra; Roger M. Dille, La Habra; Joseph P. Tassoney, Whittier, all of Calif.
[21] Appl. No. 787,190
[22] Filed Dec. 26, 1968
[45] Patented Nov. 16, 1971
[73] Assignee Texaco Inc. New York, N.Y.

[54] HYDROGEN AND CARBON MONOXIDE FROM SLURRIES OF SOLID CARBONIFEROUS FUELS
6 Claims, No Drawings

[52] U.S. Cl. ................................................ 48/206, 44/51, 48/197, 48/200, 252/373
[51] Int. Cl. ........................................................ C01b 2/14, C10j 3/16, C10l 1/32
[50] Field of Search ........................................ 48/200, 201, 202, 206, 197, 212, 215, 252/373, 376

[56] References Cited
UNITED STATES PATENTS

| | | | |
|---|---|---|---|
| 2,665,980 | 1/1954 | Carkeek | 48/212 |
| 2,669,509 | 2/1954 | Sellers | 48/206 |
| 2,864,677 | 12/1958 | Eastman et al. | 48/206 |
| 2,904,417 | 9/1959 | Te Nuyl | 48/206 X |
| 2,928,460 | 3/1960 | Eastman et al. | 122/6.5 |
| 2,941,877 | 6/1960 | Grahame | 48/206 X |
| 2,946,670 | 7/1960 | Whaley | 48/206 |

Primary Examiner—Joseph Scovronek
Attorneys—K. E. Kavanagh and Thomas H. Whaley

ABSTRACT: Production of synthesis gas from a slurry of particulate solid carboniferous fuels, e.g., petroleum coke, coke from bituminous coal, coal, oil shale, tar sands, pitch, or mixtures of these materials in water or in a hydrocarbon liquid fuel. The amount of particulate solid carboniferous fuel in a pumpable slurry may be increased to 75 wt. percent and the particle size of the solid fuel may be increased to pass through a 12 mesh screen by the addition of 2 to 10 wt. percent of soot as produced, for example, by the partial oxidation of crude oil. The slurry at a relatively low velocity in the range of 5 to 50 feet per second is mixed with a stream of oxidizing gas at a relatively high velocity in the range of 200 feet per second to sonic velocity at the burner tip to form an atomized dispersion of water, hydrocarbon liquid fuel, oxidizing gas, and solid carboniferous fuel. Under synthesis gas-generating conditions, the atomized dispersion is reacted to produce a gaseous mixture of hydrogen and carbon monoxide. By this process, pumpable slurry feeds of low-cost solid carboniferous fuels may be gasified in a synthesis gas generator without being preheated.

3,620,698

HYDROGEN AND CARBON MONOXIDE FROM SLURRIES OF SOLID CARBONIFEROUS FUELS

BACKGROUND OF THE INVENTION

1. Field of the Invention

This invention relates to the production of synthesis gas. More particularly, it relates to improvements in the partial oxidation process for generating hydrogen and carbon monoxide by utilizing as feedstock atomized dispersions of liquid slurries of solid carboniferous fuels.

2. DESCRIPTION OF THE PRIOR ART

Sythesis gas, a mixture of carbon monoxide and hydrogen, is usually made by the partial oxidation of gaseous or liquid hydrocarbons by means of an oxidizing gas such as air, oxygen (95 mole percent or more) or oxygen-enriched air (40 mole percent $O_2$ or more). The raw synthesis gas leaving the unpacked noncatalytic reaction zone of the synthesis gas generator at a temperature in the range of about 1,800 to 3,200° F. comprises principally CO and $H_2$, together with minor amounts of $H_2O$, $CO_2$, $CH_4$, $H_2S$, and free particulate carbon or soot. For a more complete description of the synthesis gas process, refer to U.S. Pat. No. 2,809,104 issued to Dale M. Strasser et al.

Synthesis gas mixtures are important commercially as a source of hydrogen for hydrogenation reactions, and as a source of feed gas for the synthesis of hydrocarbons, oxygen-containing organic compounds, or ammonia.

The gaseous and liquid hydrocarbon fuels used in conventional processes for manufacturing synthesis gas include methane, propane, naphtha crude oil, and vacuum residuum. Heavy oils are usually vaporized and mixed with superheated steam in a tubular furnace, and the resulting fuel-steam mixture is then mixed with an oxidizing gas in a burner. Previous to our invention many processing problems made impractical the gasification of slurries of solid carbonaceous fuels. For example, preheating the slurry feed in a tubular furnace was troublesome as solids would plug the furnace tubing during vaporization of the slurry. Plugging of the tubing might occur even with dilute slurries having a solids content of 1 to 4 wt. percent. Although by diluting slurries one might improve their pumpability, this is undesirable since dilution adds excessive amounts of water to the gas generator, which may lead to increased oxygen consumption. Further, it was found that the surface area of the particulate carbon formed in the synthesis gas process is related to the $H_2O$ to fuel ratio and excess $H_2O$ caused problems in the carbon-recovery system.

Since our invention requires substantially no preheating, the aforesaid plugging difficulties are eliminated and slurries with greater solids content, e.g. 75 wt. percent may be used as feed, thereby reducing considerably the quantity of $H_2O$ fed to the synthesis gas generator.

SUMMARY

By the process of our invention a high solids slurry of particulate solid carboniferous fuel, e.g., petroleum coke, coke from bituminous coal, coal, oil shale, tar sands, and pitch in a liquid vehicle selected from the group comprising water, hydrocarbon oil, or both is passed through the inner conduit of an annulus type burner at a relatively low velocity of 5 to 50 feet per second. The amount of particulate solid carboniferous fuel in a pumpable slurry may be increased to 75 wt. percent and the particle size of the solid fuel may be increased to pass through a standard 12 mesh screen by the addition of 2 to 10 wt. percent of soot as produced for example by the partial oxidation of crude oil in a synthesis gas generator. Simultaneously, at a relatively high velocity in the range of from 200 feet per second to sonic velocity at the burner tip, a converging atomizing stream of oxidizing gas is passed through a concentric annular passage in the burner. The two streams meet from 0-6 inches in front of the burner face which is located inside of the reaction zone of an unpacked noncatalytic synthesis gas generator. There they mix and form an atomized dispersion of water, hydrocarbon liquid fuel, oxidizing gas, and particulate solid carboniferous fuel. If desired the water may be introduced into the burner as steam mixed with the oxidizing gas or as a liquid vehicle for the solid fuel. Under synthesis gas-generating conditions, the atomized dispersion is reacted to produce a gaseous mixture of hydrogen and carbon monoxide. By the process of our invention, pumpable slurry feeds of low-cost solid carboniferous fuels may be gasified in a synthesis gas generator without being preheated.

It is therefore a principal object of the present invention to improve the economy and efficiency of the continuous partial oxidation process for producing large volumes of synthesis gas comprising principally hydrogen and carbon monoxide and containing controlled amounts of particulate carbon.

Another object of the invention is to utilize directly as feedstock in the partial oxidation process for producing synthesis gas pumpable slurries containing up to 75 wt. percent of low-cost particulate solid carboniferous fuels.

A still further object of the invention is to react liquid slurries of particulate solid carboniferous fuel with an oxidizing gas in a novel manner which avoids preheating the slurry and which produces superior results upon gasification.

DESCRIPTION OF THE INVENTION

The gasification of liquid slurries of solid carboniferous fuels (containing about 10 to 75 wt. percent of solids) may be accomplished in accordance with the process of our invention using an annulus type burner, for example as shown in the drawing of coassigned U.S. Pat. No. 2,928,460 issued to DuBois Eastman, Charles P. Marion, and William L. Slater. The front end of the annulus-type burner assembly, as shown in FIG. 2 of said drawing, is inserted into the compact, unpacked, noncatalytic reaction zone of a synthesis gas generator of the type described in U.S. Pat. No. 2,980,523 issued to R. M. Dille et al. The front end of said burner comprises an inner conduit 10, through which the liquid-solid slurry may be passed, surrounded by an annular passage 15 through which an oxidizing gas or an oxidizing gas steam mixture may be passed. In preparing the liquid-solid slurry, the liquid vehicle for the solid carboniferous fuel may be water or a hydrocarbon liquid fuel or a mixture of both. When the liquid vehicle is water, steam need not be mixed with the oxidizing gas. The oxidizing gas may be air, oxygen-enriched air (more than 40 mole % $O_2$), or pure oxygen (more than 95 mole % $O_2$).

Near the tip of the burner said annular passage converges inwardly in the shape of a hollow, right cone, as shown in FIG. 2 of U.S. Pat. No. 2,928,460. The oxidizing gas or oxidizing gas-steam mixture is thereby accelerated and discharged from the burner as a high-velocity conical stream having an apex angle in the range of about 30° to 45°. The streams from the burner converge at a point located about 0-6 inches beyond the burner face. The high-velocity stream of oxidizing gas hits the relatively low-velocity stream of liquid-solid slurry, atomizing it and forming a fine mist comprising minute particles of water, hydrocarbon liquid fuel, and particulate solid carboniferous fuel highly dispersed in said oxidizing gas. The particles of solid carboniferous matter impinge against one another and are fragmented further. The velocity of the slurry is in the range of 5 to 50 feet per second and the velocity of the oxidizing gas is greater than 100 feet per second and preferably at a velocity in the range of 200 feet per second to sonic velocity at the burner tip.

While this discussion was based on a burner and feed stream arrangement as previously described, it is understood that the feed to the burner may be reversed. That is in another embodiment of our invention, the liquid-solid slurry may be passed through the annular passage 15 while the oxidizing gas or oxidizing gas-steam mixture is passed through the inner conduit 10.

In the preparation of slurries of coke and other solid carboniferous fuels, in order to keep the solid particles in suspension thereby preventing the settling and plugging of pipes, lines, pumps, and valves, it was found desirable to grind the material quite fine (about −325 screen). However, grinding material this fine increases its surface area and decreases the amount of solids that can be mixed with the liquid vehicle before the slurry becomes too thick to be pumped. A water slurry of petroleum coke ground to −325 mesh is no longer pumpable when the solids content exceeds about 40 wt. percent; and, at 50 wt. percent, the slurry is solid and definitely unpumpable. Thus, although fine grinding to −325 mesh may be desirable in certain respects, it is expensive and may result in dilute slurries with excess water being added to the synthesis gas generator.

It was unexpectedly found that by adding to an unpumpable slurry of particulate solid carboniferous fuel about 2–10 wt. percent of particulate free carbon soot of the type produced by the partial oxidation of crude oil in a synthesis gas generator, the amount of particulate solid carboniferous fuel in the slurry may be increased to 75 wt. percent, the slurry may be readily pumped, and settling is greatly diminished. Although the slurry may appear thickened or gelled, the mixture is thixotropic and will easily work into a fluid which can be readily pumped. Further, the particle size of the solid carboniferous fuel may be increased from −325 to −12 mesh. Now by our invention −12 mesh particles of solid carboniferous fuel are fine enough to stay in suspension and are easily reacted in the synthesis gas generator. Also, the larger particle size results in reduced grinding costs and the solids content of the slurries may be increased. With water and distillate hydrocarbon liquid fuels, such as water, naphtha, and gas oils, about 2–4 wt. percent of free carbon soot will thicken the mixture enough to prevent settling; however, with nondistillate hydrocarbon liquid fuels such as fuel oil, about 4–10 wt. percent of soot may be required. Soot is based on amount of liquid vehicle.

Electron micrographs of the soot particles suitable for use as a slurry gelling agent in the process of our invention resemble hollow spheres of "spongelike" texture of less than 70 millimicrons in diameter. Because of this structure the carbon has a tremendously high surface area, about 300 to 1,000 square meters per gram. The carbon varies in surface area depending on the generator conditions and the ash content of the fuel. Generally the surface area is related to the oil adsorption number, which is determined by ASTM Method D-281 and may be expressed by cubic centimeters of oil required to make a single coherent ball of paste from a 1 gram sample of dry particulate carbon. The oil adsorption number of typical free carbon blacks or soot made by the partial oxidation process is greater than 1 and usually varies from 2 to 4 cc. of oil per gram of C. The surface area of the carbon limits the loading of carbon in fuel oil. Because of the high adsorption number, i.e., greater than 1, slurries of the free carbon soot in water or in a hydrocarbon liquid fuel tend to become gels at low carbon concentrations. Particulate carbon-soot is both oleophilic and hydrophilic. Whereas, a gram of soot will absorb 2–3 cc. of oil, it will also absorb large amounts of water. It is postulated that this property of the free carbon soot makes it a good gelling or thixotropic agent when added in small amounts to slurries water and hydrocarbon liquid fuels with petroleum coke, which has an oil absorption number of less than 1. An analysis follows of soot made by the partial oxidation of residual fuel oil in a synthesis gas generator as described in U.S. Pat. No. 2,809,104 issued to D. Strasser and F. Guptill. In weight percent the soot comprises: carbon 92.3 to 93.4, hydrogen 0.35 to 1.05, sulfur 0.27 to 0.59, and ash 3.36 to 4.64.

Partial oxidation of the feed takes place in the reaction zone of the synthesis gas generator at a temperature in the range of about 1,800 to 3,500° F. and at a pressure in the range of about 100 to 3,000 p.s.i.g. The atomic ratio of free oxygen to carbon in the feed is a value in the range of 0.70 to 1.2 and the weight ratio of water to fuel present in the reaction zone is a value in the range of 0.2 to 3.0. The composition of the effluent stream of synthesis gas leaving the generator expressed as mole percent dry basis is as follows: $H_2$ 30 to 49, CO 35 to 68, $CO_2$ 7 to 25, $CH_4$ 0.1 to 8.0, COS+$H_2$S 0.1 to 2, and unconverted petroleum coke+soot 1 to 20.

The process of the invention, as just described, requires no preheat for the reactants. However, if desired the oxidizing gas or the oxidizing gas-steam mixture may be heated to a temperature in the range of about 100° to 600° F. to reduce oxygen consumption. Similarly, the slurry may be heated to a temperature in the range of about 100° to 300° F., but below the vaporization temperature of the liquid vehicle, to reduce the viscosity of the slurry and to improve its pumpability.

Although our invention is described hereinafter in particular with reference to petroleum coke, as previously stated it is applicable to other solid carboniferous fuels including coal, coke from bituminous coal, oil shale, tar sand, and pitch.

Petroleum coke is comprised in general of minute graphitelike crystals imbedded in an organic matrix of highly condensed aromatic compounds such as anthracene, phenathracene, chrysene, picene and crackene. Petroleum coke suitable for use as a starting material in the process of this invention may be produced by the "delayed coking" process — a special process for converting heavy residual fuel oil into gasoline, gas oil, and coke or by other petroleum coking processes that produce a petroleum coke having a similar structure and chemical analysis. The solid carboniferous residue remaining after the high-temperature distillation of moisture and volatile matter from bituminous coal is also known by the name coke and may be also gasified in the manner taught by the process of our invention. Typical analyses of petroleum coke and coke from bituminous coal in wt. percent follow:

|  | Petroleum Coke | Bituminous Coal Coke |
| --- | --- | --- |
| Volatiles | 4–7 | 0.5–4.6 |
| Fixed Carbon | 92–96 | 76–95 |
| Ash | 0.2–1.3 | 0.5–20 |
| Sulfur | 0.5–5 | 0.5–5 |
| $H_2O$ | 0 | 0.5–5 |
| Density, g./ml. | 1.28–1.6 | 1.3–1.8 |
| Oil Absorption No. | 1.0 | 1.0 |

The carboniferous solid fuel may now by the process of our inventor be pulverized to a particle size which passes through a U.S. Standard 12 mesh screen. Any suitable standard grinding procedure may be used, e.g. U.S. Pat. No. 2,846,150 issued to Lincoln T. Work. The small size of the solid fuel particle is important to assure a uniform suspension in the liquid vehicle which will not settle out, to allow sufficient motion relative to the gaseous reactants, to assure substantially complete gasification, and to provide pumpable slurries of high solids content with a minimum of grinding.

Vaporizable liquid vehicles which are suitable for the preparation of the suspension include water, coal oil, shale oil, gasoline, kerosene, naphtha, gas oil fractions of petroleum distillate, benzene, toluene, hexane, heptane, cyclohexane, tetralin, decalin, fuel oil, residual fuel oil, reduced crude oil, whole crude oil, and mixtures of these various liquids. Also, water and hydrocarbon liquid fuel mixtures, suitably in the form of emulsions with an emulsifying agent, or with a gelling agent such as pectins may be used in preparing the liquid-solid carboniferous fuel slurry.

EXAMPLES OF THE PREFERRED EMBODIMENTS

The following examples are offered as a better understanding of the present invention, but the invention is not to be construed as limited thereto.

EXAMPLE I 1,424 lbs. of petroleum coke are prepared from reduced crude oil by the "delayed coking" process and crushed to a particle size so that 100 wt. percent passes through a U. S. Standard 12 mesh sieve. The oil absorption number of the petroleum coke is less than 1. The petroleum coke is mixed with 854 lbs. of 12° API gravity crude oil. The resulting slurry containing 62.3 percent by wt. of solid fuel could not be readily pumped at a uniform rate and composition because of settling in the lines and plugging of valves. 95 lbs. of soot produced by the partial oxidation of a hydrocarbon fuel oil and having a particle size of less than 10 microns and an oil adsorption number greater than 1 were then added to the petroleum coke-oil slurry to increase the solids content of the slurry to 64 wt. percent. The slurry became thicker and gel-like. Settling was greatly diminished. Although the slurry appeared semisolid it could be easily worked into a pumpable fluid without increasing the temperature.

EXAMPLE II 1,424 pounds of petroleum coke prepared from reduced crude oil by the "delayed coking" process is ground to a particle size so that 100 percent passes through a U.S. Standard 12 mesh seive. The ground coke is mixed with 854 pounds of 12°API gravity crude oil and 95 pounds of soot. An analysis of the coke, soot and crude oil is shown below in table I. 2,373 lbs./hr. of the resulting slurry containing 64 percent by wt. of solids is pumped at a rate of 25 ft./sec. and at a temperature of 100° F. through the central passage of an annulus-type burner as shown in FIG. 2 of the aforesaid U.S. Pat. No. 2,928,460. The burner is mounted in the top head of a compact, unpacked, noncatalytic 160 c.f. synthesis gas generator in the manner shown in FIG. 1 of U.S. Pat. No. 2,980,523. 1,186 lbs./hr. of steam and 2,512 lbs./hr. of oxygen (100 mole percent are combined and at a rate of 350 ft./sec. and at a temperature of 425° F. are introduced into the annular passage of said burner. 106,400 s.c.f.h. of synthesis gas is produced in the gas generator from the ensuing partial oxidation reaction at a temperature of 2,650° F. and at a pressure of 550 p.s.i.g. An analysis of the product gas follows: In mole percent dry basis: $H_2$ 37.9, CO 53.0, $CO_2$ 8.0, $H_2S$ 0.4, and soot + unconverted coke 3.8.

TABLE I.—FEED TO GENERATOR

| Element | Units | Oil | Petroleum coke | Soot | Slurry feed |
|---|---|---|---|---|---|
| C | Wt. percent | 87.43 | 91.47 | 95.4 | 90.17 |
| H | do | 10.41 | 3.75 | 1.0 | 6.04 |
| N | do | 0.77 | 2.75 | 0.2 | 1.93 |
| Ash | do | 0.11 | 0.43 | 3.0 | 0.42 |
| S | do | 1.28 | 1.60 | 0.4 | 1.44 |
| Ni | P.p.m. | 67 | 533 | 1,600 | 407 |
| V | do | 60 | 640 | 1,500 | 466 |

A summary of the performance data follows:

| | |
|---|---|
| Oxygen/Fuel Ratio, SCF/lb. | 12.55 |
| Water/Fuel Ratio, lb./lb. | 0.50 |
| Oxygen/Carbon Ratio, atom/atom | 0.881 |
| Oxygen Consumption, SCF/MSCF $H_2$+CO | 307.96 |
| Gas Velocity, fr./sec., gen. exit | 46.76 |
| Residence Time, sec. | 3.20 |

The process of the invention has been described generally and by examples with reference to liquid-solid carboniferous fuel slurries and synthesis gas of particular compositions for purposes of clarity and illustration only. It will be apparent to those skilled in the art from the foregoing that various modifications of the process and materials disclosed herein can be made without departure from the spirit of the invention.

We claim:

1. A partial oxidation process for producing synthesis gas which comprises:
   1. mixing together 10–75 wt. percent of particulate solid carboniferous fuel having a particle size which passes through a U.S. Standard No. 12 mesh sieve, a liquid vehicle selected from the group consisting of water, hydrocarbon liquid fuel, and mixtures of water and said hydrocarbon liquid fuel, and 2–10 wt. percent (basis said liquid vehicle) of free carbon soot having an oil adsorption number greater than one, to form a pumpable slurry;
   2. atomizing the slurry of ( ) in the reaction zone of a synthesis gas generator by contacting a stream of said slurry at relatively low velocity in the range of 5 to 50 feet per second with a stream of oxidizing gas at a relatively high velocity in the range of 100 feet per second to sonic velocity and selected from the group consisting of air, oxygen, oxygen-enriched air, and mixtures of stream and one of said oxidizing gases to form an atomized dispersion in which the ration of atoms of oxygen to atoms of carbon is in the range of 0.7 to 1.2 and the weight ratio of $H_2O$ to fuel is in the range of 0.2 to 3.0; and 3. reacting the atomized dispersion of (2) in said reaction zone at a temperature in the range of 1,800° to 3,500° F. and a pressure in the range of 100 to 2,000 p.s.i.g.

2. The process of claim 1 wherein the hydrocarbon liquid fuel in (1) is selected from the group consisting of gasoline, naphtha, residual fuel oil, reduced crude oil, whole crude oil, shale oil, coal oil, and tar sand oil.

3. The process of claim 1 wherein said solid carboniferous fuel is selected from the group consisting of petroleum coke, coal, coke made from bituminous coal, oil shale, tar sands, pitch, and mixtures of said materials.

4. The process of claim 1 wherein the atomizing of (2) is effected by passing said stream of slurry at a velocity of 5 to 50 feet per second through the inner conduit of an annulus-type burner in said reaction zone and contacting said stream with said stream of oxidizing gas passing at a velocity in the range of 200 feet per second to sonic velocity at the burner tip through the annular passage of said burner.

5. The process of claim 1 wherein the atomizing of (2 ) is effected by passing said stream of oxidizing gas at a velocity in the range of 200 feet per second to sonic velocity at the burner tip through the inner conduit of an annulus-type burner in said reaction zone and contacting said stream with a stream of said slurry passing at a velocity of 5 to 50 feet per second through the annular passage of said burner.

6. In a process for the gasification of solid carboniferous fuel to produce a gaseous mixture comprising $H_2$, CO, $CO_2$ and $H_2O$ the improvement which comprises:
   1) grinding to −12 mesh a solid carboniferous fuel selected from the group consisting of petroleum coke, oil shale, coal, coke made from bituminous coal, tar sands, pitch, and mixtures of said materials;
   2 mixing together about 10–75 wt. percent of the ground solid carboniferous fuel of (1) with a liquid vehicle selected from the group consisting of water, gasoline, naphtha, residual fuel oil, reduced crude oil, whole crude oil, coal oil, shale oil, tar sand oil, and mixtures of said liquid vehicles, and admixing at least 2 wt. percent (basis liquid vehicle) of free carbon soot having an oil absorption number greater than 1 so as to produce a pumpable liquid-solid slurry;
   3 passing a stream of the slurry of (2) at a relatively low velocity in the range of 5 to 50 feet per second through the inner conduit of a burner situated in the reaction through the inner conduit of a burner situated in the reaction zone of a synthesis gas generator and having an annular passage;
   4. passing a stream of oxidizing gas selected from the group consisting of air, oxygen-enriched air, oxygen, and mixtures of steam and one of said oxidizing gases through the annular passage of said burner at a relatively high velocity in the range of 100 feet per second to sonic velocity, contacting said streams in said reaction zone to produce an atomized dispersion of said liquid vehicle, oxidizing gas, and particulate solid carboniferous fuel in which the ratio of the atoms of oxygen to atoms of carbon is in the range of 0.7–1.2 to 1.0 and the weight ratio of $H_2O$ to fuel present is in the range of 0.2–3.0 to 1.0; and
   5. reacting the atomized dispersion of (4) in said reaction zone at a temperature in the range of 1,800° to 3,500° F., and a pressure in the range of 100 to 3,000 p.s.i.g. to produce a gaseous mixture comprising $H_2$, CO, $CO_2$ and $H_2O$.

* * * * *